United States Patent [19]

Tajali

[11] Patent Number: 5,414,590
[45] Date of Patent: May 9, 1995

[54] METER SOCKET ASSEMBLY AND DISTRIBUTION BOARD

[75] Inventor: Gholam R. Tajali, Nashville, Tenn.

[73] Assignee: Square D Company, Palatine, Ill.

[21] Appl. No.: 142,255

[22] Filed: Oct. 22, 1993

[51] Int. Cl.$^6$ ............................................. H02B 9/00
[52] U.S. Cl. ................................ 361/669; 324/156; 361/624; 361/648; 361/832; 439/167
[58] Field of Search ............ 200/51 R; 324/114, 156; 439/620, 166, 167; 174/52.1, 59, 60, 65 R, 70 B, 71 B, 72 B; 361/601, 622, 624, 641, 643, 648, 652, 659, 660, 664, 668, 669, 724, 823, 826, 828, 829, 832

[56] References Cited

U.S. PATENT DOCUMENTS

| | | | |
|---|---|---|---|
| 3,707,653 | 12/1972 | Coffey | 317/120 |
| 3,787,713 | 1/1974 | Diersing | 317/119 |
| 4,369,484 | 1/1983 | Fugate | 361/334 |
| 4,413,306 | 11/1983 | Erickson | 361/361 |
| 4,450,503 | 5/1984 | Warner | 361/356 |
| 4,532,574 | 7/1985 | Reiner | 361/365 |
| 5,225,962 | 7/1993 | Neill | 361/357 |

Primary Examiner—Gerald P. Tolin
Attorney, Agent, or Firm—Larry I. Golden; Kareem M. Irfan

[57] ABSTRACT

The present invention provides an electrical distribution board and meter socket assembly. The distribution board includes a framework for a meter compartment which is partially defined by a side panels, a bottom electrically insulating barrier and by a bus. The distribution board also includes an opening through each side panel and between each side face of the framework and the bottom barrier. The opening is of sufficient size to allow electrical connections therethrough. An L-shaped insulating barrier connects to the bottom barrier and is disposed in front of the bus. The meter socket assembly includes a socket pan, a socket molding assembly for an electrical meter, a test block assembly, and a plurality of load terminals adapted for electrically connecting to branch lines which overlap one another and extend from the load terminals in a direction generally parallel to the bottom edge. The meter socket assembly also includes a plurality of line terminals adapted for electrically connecting to line bars.

16 Claims, 4 Drawing Sheets

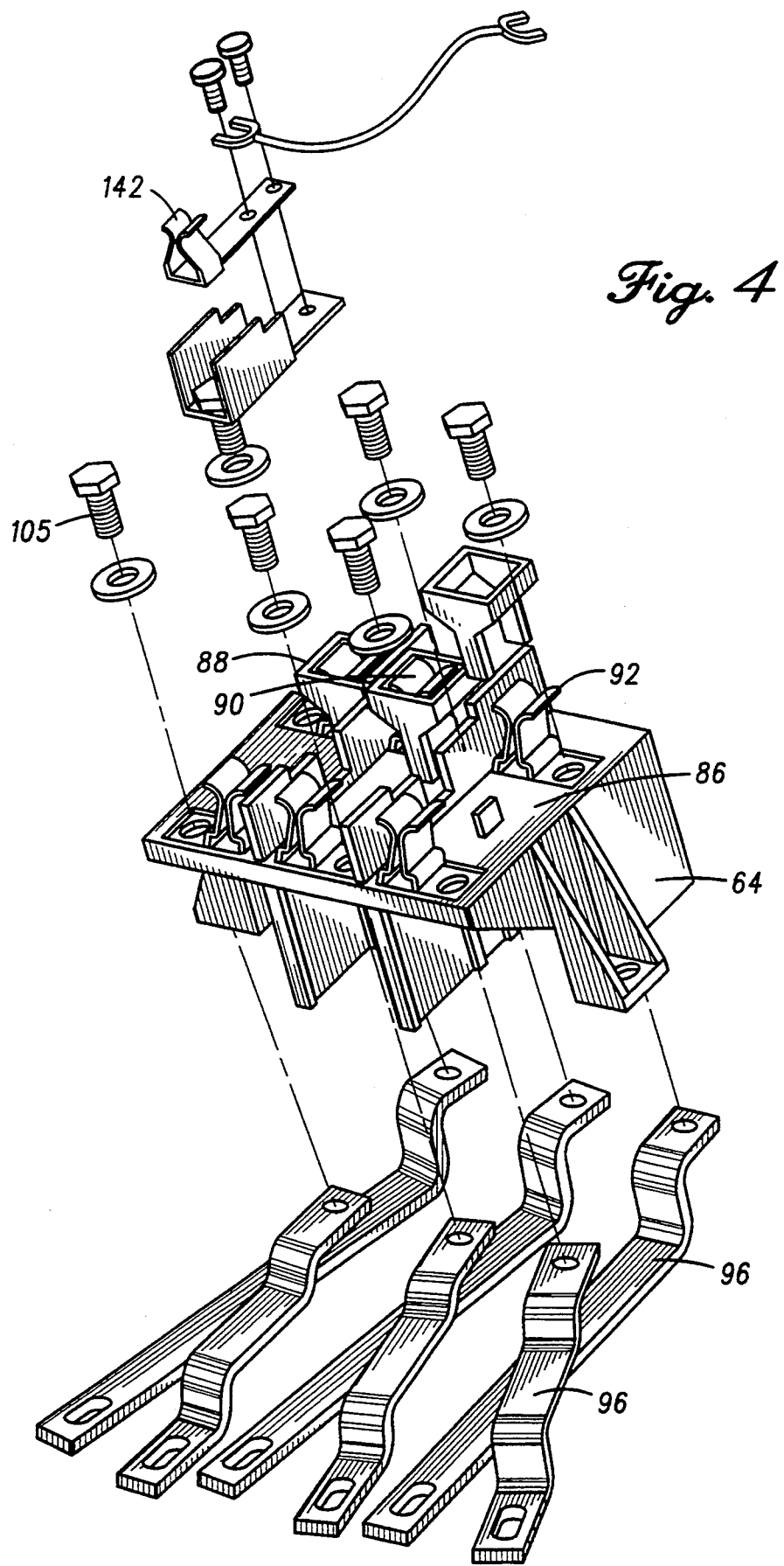

METER SOCKET ASSEMBLY AND DISTRIBUTION BOARD

Related Application

Related co-pending U.S. application Ser. No. 08/141835, filed on even date herewith discloses one class of meter socket units which is suitable for use in the present application. The entire teaching and disclosure of that copending application is incorporated herein by reference.

FIELD OF THE INVENTION

The present invention relates to metering equipment for the distribution and metering of electrical power and, particularly, to a framework structure supporting bus bars and meter socket assemblies for electrical connection therebetween.

BACKGROUND OF THE INVENTION

It is known to provide modular arrangements for use in electrical power distribution. These modular arrangements include control devices like molded case circuit breakers of standard dimensions that are adapted to be plugged onto busbars to establish their electrical connection, e.g., British Patent Nos. 1,161,030 and 1,181,893. The entire teachings and disclosures of these patents are incorporated by reference herein.

The modular arrangements also include monitoring equipment like branch meter socket plug-in units. An example of a meter unit is sold commercially by the Square D Company, the assignee hereof, under the classification Commercial Metering Equipment.

Due to the physical constraints of many installations, it is desirable to minimize the width of the distribution board utilizing such a modular arrangement. To overcome this problem, the electrical connections to the modular circuit breaker must be accessed in cramped quarters, increasing the time needed to complete the installation or servicing.

Another problem encountered by modular arrangements is that the modular design itself often fosters time consuming and expensive assembly and connection of branch lines between compartments within the distribution board. The poor organization of internal connections compounds the tight-fit of the modules which may also lead to safety problems.

The art needs a new and improved distribution board and accompanying components like a meter socket assembly which complement each other. By organizing the electrical connections made to each meter socket assembly and between other compartments in the distribution board, their set-up, expansion, and servicing is safe, inexpensive and quick. The present invention provides such an improved distribution board and meter socket assembly.

SUMMARY OF THE INVENTION

In accordance with the present invention, an electrical distribution board is provided which includes a framework defining a rectangular shape having a front, rear and side faces, and also side rails. A meter compartment within the framework is defined by the front face of the framework, by a pair of side panels connecting to the side rails and being disposed in a parallel relation to each other and perpendicular to the front face of the framework, by a bottom electrically insulating barrier connecting to each side panel and by a bus partially defining the rear wall of the meter compartment opposite the front face of the framework. The bus is electrically insulated from the framework and has one side facing the meter compartment adapted for electrical connection.

The distribution board also includes an opening through each side panel and between each side face of the framework and the bottom barrier. The opening is of sufficient size to allow electrical connections therethrough. An L-shaped insulating barrier connects to the bottom barrier and is disposed in front of the bus. Whereby, the meter compartment is adapted to mount therein a meter socket assembly and to electrically connect line terminals extending from the rear face of the meter socket assembly to the bus and to electrically connect load terminals from the bottom edge of the meter socket assembly through the opening to other compartments.

The present invention also includes a meter socket assembly for connection between a line bus and a branch load. The meter socket assembly includes a socket pan having a generally flat shape with a front face and a back face, and a top, bottom and side edges. The side edges are integrally formed with a pair of upstanding walls. Each upstanding wall has a flange extending outwardly and perpendicularly therefrom. A socket molding assembly is included which has a socket base supporting at least two pairs of terminal clips adapted for electrically connecting to an electrical meter. Each terminal clip is secured to one end of a corresponding first bar extending downward. The socket base is positioned near the top edge and secured to the front face of the socket pan with an insulator positioned therebetween.

The meter socket assembly includes a test block assembly having a test base for securing thereto a second bar connecting to the opposite end of the corresponding first bar and a line bar and a load bar for each phase. Each line bar and load bar connecting at one end to the corresponding second bar. The test base is positioned near the bottom edge and secured to the front face of the socket pan. A plurality of load terminals is adapted for electrically connecting to branch lines. Each load terminal connects to one end of a corresponding load bar. Each load terminal is positioned below the bottom edge of the socket pan in a different overlapping plane from the other. Whereby, the branch lines overlap one another and extend from the load terminals in a direction generally parallel to the bottom edge providing access to each load terminal from the front face of the socket pan.

The meter socket assembly also includes a plurality of line terminals adapted for electrically connecting to line bars. Each line terminal connects to one end of a corresponding line bar. Each line terminal is positioned in the same plane below the bottom edge and beyond the back face of the socket pan. Mounting means on the flanges position the socket pan parallel relative to the bus and enable movement of the socket pan to provide sufficient force perpendicular to the bus for resiliently engaging and disengaging the line terminals.

One object of the present invention is to provide a support framework which allows inexpensive assembly, reinforced support for modules inserted therein, and ease of electrical connection for the neutral potential insulator.

Another object is to provide a meter socket assembly which is inexpensively assembled and wherein electrical connections thereto are conveniently accessible even after installation.

A further object is to decrease the time needed for installation or servicing by providing a meter socket assembly which tilts away from its operational position to provide greater access to its components.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 4 is an exploded front perspective view of a socket molding assembly isolated from the multiphase meter socket assembly of FIG. 2.

DETAILED DESCRIPTION

Figure 1:
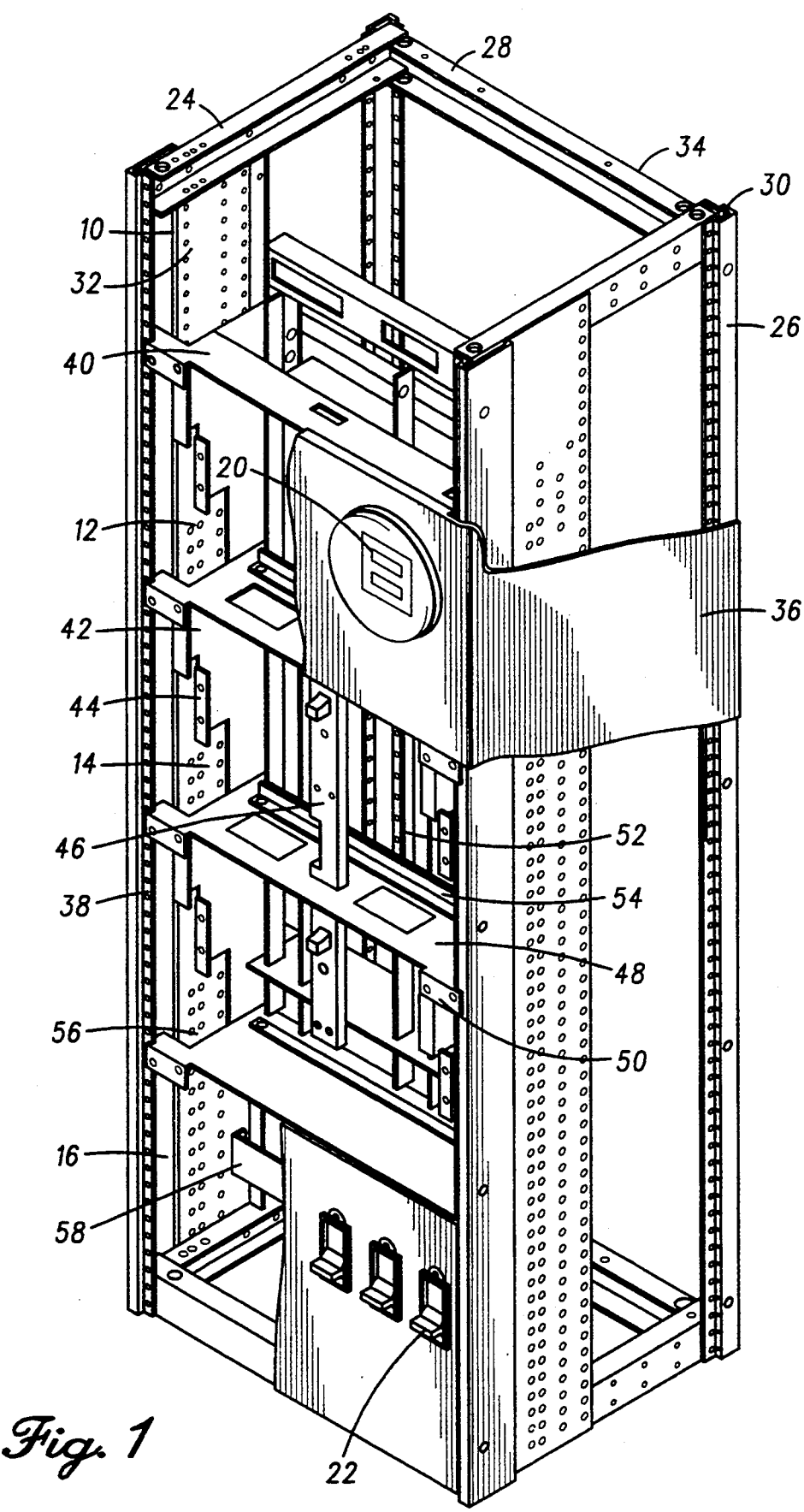
FIG. 1 is a front perspective view of a distribution board of the present invention with the interior assembly partially exposed.

Referring now to the drawings there is illustrated a distribution board embodying the present invention. In FIG. 1 the distribution board 10 is defined with a plurality of compartments like meter compartments 12, 14 and a control device compartment 16. The meter compartment 12 is illustrated with a side-by-side arrangement of utility meters 20. The control device compartment 16 is illustrated with circuit breakers 22 mounted therein. The use of other control devices like fusible switches is also suitable.

The distribution board 10 of the present invention can be used in a variety of compartment arrangements. The stacked configuration of the compartments can be repeated any number of times. The distribution board 10 can be arranged with a mixture of compartments as illustrated, or all one type of compartment. The present invention also contemplates a distribution board 10 with physical dimensions like width and depth modified to accommodate the particular usage. For example, the meters 20 can be stacked in a single column resulting in a more narrow distribution board 10.

The distribution board 10 includes a framework structure generally designated as 24. The framework incorporates vertical structural components 26 and horizontal structural components 28 connected together by corner joints 30 to form a generally rectangular shape. The framework 24 defines a front face 32, a rear face 34, and side faces 36.

Preferably, the structural members contain a number of pre-formed holes 38 spaced at regular intervals for the attachment of cross-members 40 within the framework 24. The cross-members 40 reinforce the framework 24 and provide a support platform for mounting components within the framework 24.

Figure 2:
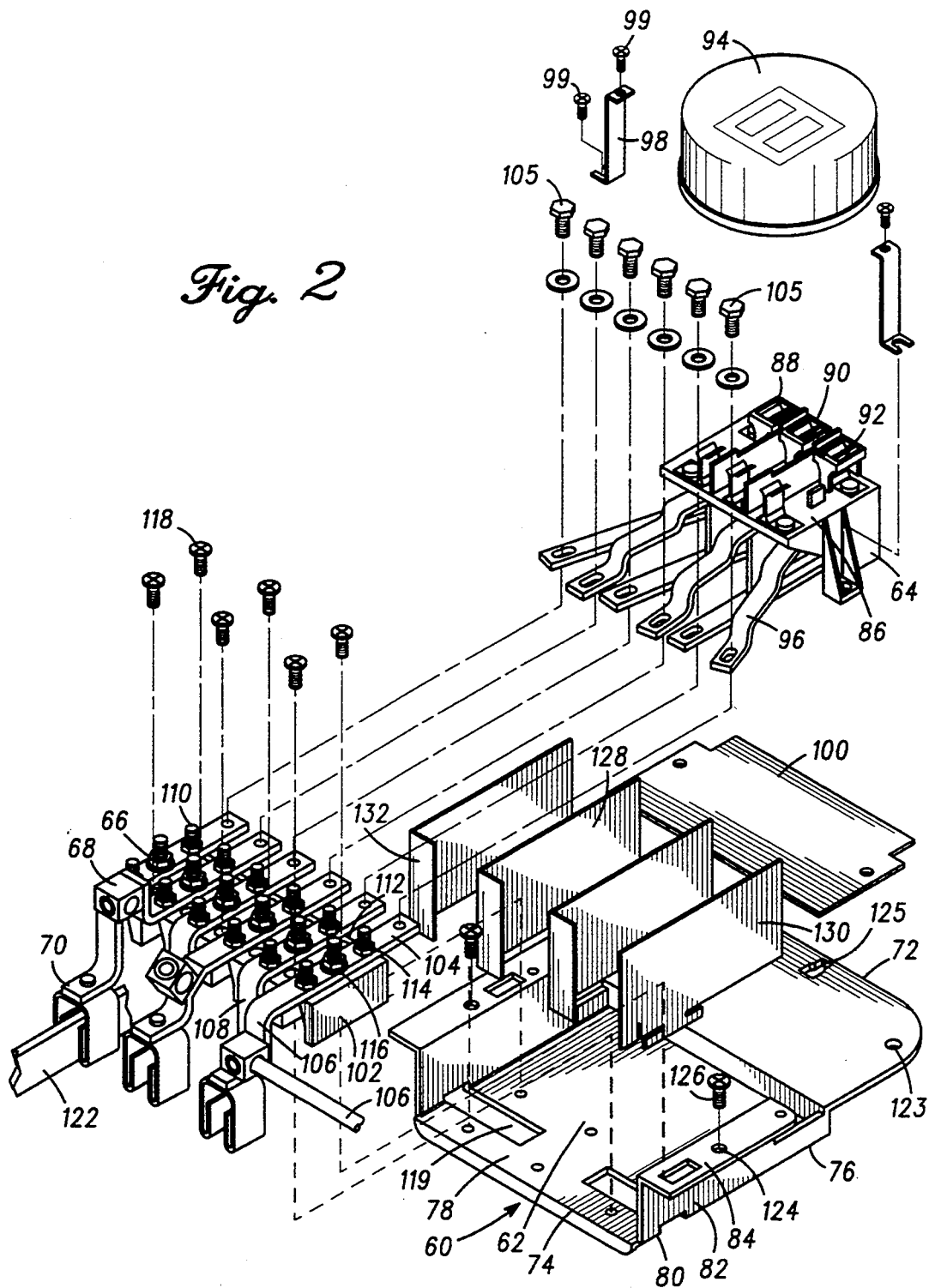
FIG. 2 is an exploded front perspective view of a multiphase meter socket assembly of the present invention isolated from the distribution board.

Attached to the framework 24 are side panels 42 having a mounting flange 44 extending perpendicularly therefrom and inwardly into the meter compartment 14. A middle rail 46 is attached to the cross members like 40. The middle rail 46 stiffens the framework 24 and supports a meter socket unit, as illustrated in FIG. 2, between itself and the mounting flange 44 of one of the side panels 42. In an alternate inventive embodiment where meters 20 are stacked in a single column, the middle rail 46 is eliminated and the meter socket unit is supported directly between the mounting flange 44 of each side panel.

Each meter compartment like 14 is defined by the front face 32 of the framework, the side panels 42, and a bottom insulating barrier 48. A mounting channel 50 supports the bottom barrier 48 and connects to the vertical structural components 26. The middle rail 46 extends through the bottom barrier 48.

Attached to the bottom barrier 48 near the rear of the meter compartment 14 is a conventional electrical vertical bus 52 for an electrical load connection. Preferably, the vertical bus 52 is a multiphase I-Line TM bus produced by the Square D Company. The illustrated bus 52 is for a multiphase circuit and, accordingly, has three components. In a single phase embodiment also included in the present invention, the middle component for the neutral phase is removed. Attached to the bottom barrier 48 is an L-shaped insulating barrier 54 mounted in front of the vertical bus 52.

Openings like 56 are provided between the bottom barrier 48, the side panels 42 and the side faces 36 of the framework. The openings 56 are of sufficient size to allow cables or wiring (not shown) for branch line connections to exit the meter compartment 14 and run parallel to the side faces 36 of the framework into other compartments of the distribution board 10.

The control device compartment 16 receives the branch lines for connection to a plurality of circuit breakers 22. A mounting cross-member 58 connects to the framework 24 and securely mounts each circuit breaker 22.

Referring now to FIG. 2, a preferred embodiment of a meter socket assembly 60 is illustrated. The meter socket assembly 60 includes a socket pan 62, a socket molding assembly 64, a test block assembly 66, a plurality of load terminals 68, and a plurality of line terminals 70.

The socket pan 62 is defined by a top edge 72, a bottom edge 74 and side edges 76 with a generally flat shape having a front face 78 and a back face 80. Each side edge 76 is integrally formed with an upstanding wall 82 having a flange 84 extending outwardly and perpendicularly therefrom.

The socket molding assembly 64 includes a socket base 86 supporting a plurality of terminal clip pairs 88, 90, 92. At least two terminal clip pairs like 88 and 92 are adapted for electrical connection to a conventional meter 94. Each terminal clip of pairs 88, 90, and 92 electrically connect to a first bar like 96. The socket base 86 is mounted to the front face 78 of the socket pan by screws 99 near the top edge 72. An electrically insulating layer 100 is positioned between socket base 86 and the front face 78.

The test block assembly 66 includes a plurality of test bases 102 for securing thereto a second bar 104 which connects to the opposite end of each corresponding first bar 96. The electrical connection therebetween is made with bolts 105. Also secured to each test base 102 is a load bar 106 and a line bar 108 for each phase.

Bolts 110 extend through each test base 102 from the underside to affix the second bar 104, load bar 106 and line bar 108 within channels across the top surface 112 of each test block. The head of a disconnect stud 114 and an adjacent insulator washer 116 also fits snugly within the channel on the top surface 112 between each second bar 104 and the corresponding load bar 106 or line bar 108. A washer and nut is tightened on each disconnect stud 114 to complete the electrical connection. The ability to disconnect the circuit between each second bar 104 and the corresponding load bar 106 or line bar 108 allows for testing or monitoring. Each test base 102 is mounted to the front face 78 of the socket pan near the bottom edge 74 with screws 118.

The plurality of load terminals 68 are adapted for electrically and mechanically connecting to branch lines like cable 120. Preferably, a lug-type terminal is used for the connection. Each load terminal like 68 connects to one end of the corresponding load bar 106. Each load terminal 68 is positioned below the bottom edge 74 of the socket pan in a different, yet overlapping, plane from the remainder of the load terminals 68. The branch lines 120 extend from the load terminals 68 in a direction generally parallel to the bottom edge 74. The load terminals 68 are made conveniently accessible when the meter socket assembly 60 is tilted away from the bus 122. As described in FIG. 1 above, the cables 120 are routed out of the meter compartment 14 through the opening 56.

The plurality of line terminals 70 are adapted for electrically and mechanically connecting to bus bars like 122. Preferably, a contact jaw-type terminal is used for the connection. Each line terminal like 70 connects to one end of the corresponding line bar 108. Each line terminal 70 is positioned below the bottom edge 74 and beyond the back face 34 of the socket pan in approximately the same plane. Each line bar 108 extends downwardly from the test base 102 past the bottom edge 74 and beyond the back face 34. This positions the line terminals 74 to allow easy attachment to the bus bar 122 by pushing against the front face 78 of the socket pan as it is mounted to the side panels of the distribution board 10.

The meter socket assembly 60 includes mounting holes like 124 in each flange 84 and keyhole 125. The mounting holes 124 allow screws 126 to secure each flange 84 to the mounting flange 44 on one of the side panels 42 and the middle rack 46 as illustrated in FIG. 1. The keyhole 125 is secured with a fastener to the mounting channel 50 illustrated previously in FIG. 1. The bottom edge 74 of the socket pan and the line terminals 70 tilt away from the bus bar 122. The tilt position is then secured by driving screws from the back face 80 inside-out through holes 123. Considerable force can then be applied in making the branch connections without disrupting the tilt position.

Preferably, the meter socket assembly 60 also includes a plurality of interphase barriers like 128 and 130 which are made of a conventional plastic material. Each interphase barrier 128, 130 has a flat elongated shape. One interphase barrier like 128 is positioned between each pair of line bars 108 and load bars 106 and their corresponding first bars 96 and second bars 104.

The interphase barriers like 128, which are positioned next to the line bars 108, have a barrier flange 132 integrally formed at one end. Each barrier flange 132 extends perpendicularly across the portion of the line bar 108 extending downwardly from the test base 102 beyond the back face 80 of the socket pan. Each barrier flange 132 connects to the socket pan 62 by insertion through holes 119.

Figure 3:
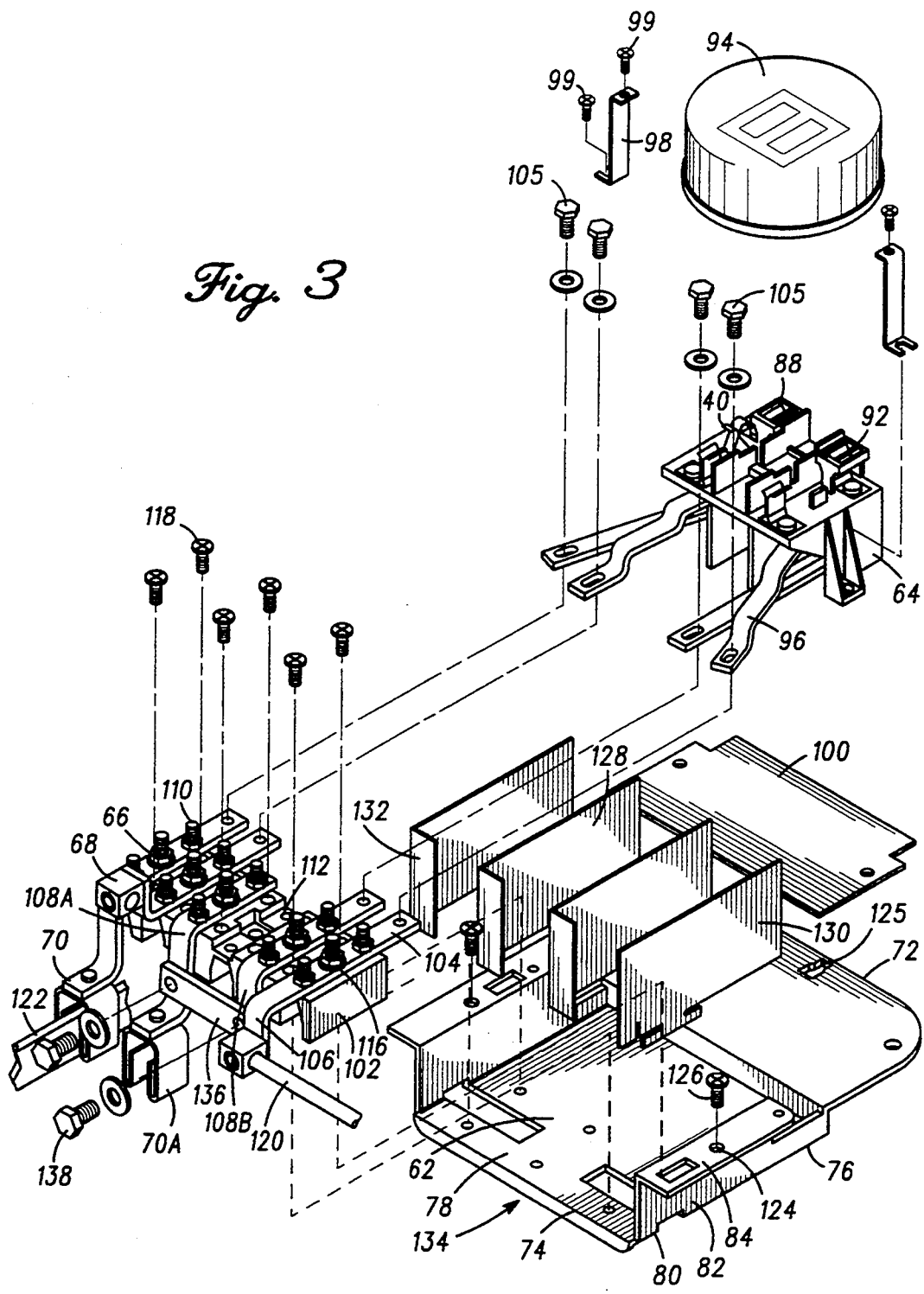
FIG. 3 is a partial front perspective view of a single phase meter socket assembly of the present invention.

Referring now to FIG. 3 there is illustrated another embodiment of the meter socket assembly 134 for single phase applications. The same reference numerals will be used for similar parts in the multiphase embodiment of the meter socket assembly 60. The meter socket assembly 134 includes a socket pan 62, a socket molding assembly 64, a test block assembly 66, a plurality of load terminals 68, and a plurality of line terminals 70.

The socket pan 62 is defined by a top edge 72, a bottom edge 74 and side edges 76 with a generally flat shape having a front face 78 and a back face 80. Each side edge 76 is integrally formed with an upstanding wall 82 having a flange 84 extending outwardly and perpendicularly therefrom.

The socket molding assembly 64 includes a socket base 86 supporting a plurality of terminal clip pairs 88 and 92 adapted for electrical connection to the AB, AC or BC meter sockets of a conventional meter 94. Each terminal clip of pairs 88 and 92 electrically connect to a first bar like 96. The socket base 86 is mounted to the front face 78 of the socket pan by screws 99 near the top edge 72. An electrically insulating layer 100 is positioned between socket base 86 and the front face 78.

The socket molding assembly also includes a neutral jaw 140 with an insulated wire for connection to a neutral riser (not shown). The orientation of the neutral jaw 140 is rotated ninety degrees from the position illustrated below for the multiphase socket molding assembly. This neutral potential connection provides greater accessibility and convenience relative to the prior art.

The test block assembly 66 includes a plurality of test bases 102 for securing thereto a second bar 104 which connects to the opposite end of each corresponding first bar 96. The electrical connection therebetween is made with bolts 105. Also secured to each test base 102 is a load bar 106 and a line bar 108 for the each phase.

The plurality of load terminals 68 are adapted for electrically and mechanically connecting to branch lines like cable 120. Each load terminal 68 is positioned below the bottom edge 74 of the socket pan in a different, yet overlapping, plane from the other load terminal.

The plurality of line terminals 70 are adapted for electrically and mechanically connecting to bus bars like 122. Each line terminal 70 is positioned below the bottom edge 74 and beyond the back face 34 of the socket pan in approximately the same plane. Each line bar 108 extends downwardly from the test base 102 past the bottom edge 74 and beyond the back face 32. A single phase connector bar 136 electrically connects two of the line bars 108 with bolts 138. The interconnected line bars 108A and 108B share one line terminal 70A. The single phase connector bar 136 can electrically short the B-phase to the C-phase or the B-phase to the A-phase.

Preferably, the meter socket assembly 134 also includes a plurality of interphase barriers like 128 and 130. Each interphase barrier 128, 130 has a flat elongated shape. One interphase barrier like 128 is positioned between each pair of line bars 108 and load bars 106 and their corresponding first bars 96 and second bars 104.

The interphase barriers like 128, which are positioned next to the line bars 108, have a barrier flange 132 integrally formed at one end. Each barrier flange 132 extends perpendicularly across the portion of the line bar 108 extending downwardly from the test base 102 beyond the back face 80 of the socket pan. The barrier flange 132 also extends partially across the single phase connector bar 136.

Referring to FIG. 4, an isolated view of the socket molding assembly 64 is illustrated in greater detail. The socket molding assembly 64 includes a socket base 86 supporting a plurality of terminal clip pairs 88, 90, 92. At least two terminal clip pairs like 88 and 92 are adapted for electrical connection to a conventional meter 94. Each terminal clip of pairs 88, 90, and 92 electrically connect to a first bar like 96.

Preferably, the pair of terminal clips 88 connect to the A-phase of the circuit. Accordingly, the terminal clips 88 are orientated closer in distance to terminal clips 90 than the distance between terminal clips 90 and 92.

The socket molding assembly 64 also includes a neutral jaw 142 with an insulated wire for connection to a neutral riser (not shown). The orientation of the neutral jaw 142 provides greater accessibility and convenience relative to the prior art.

It will be understood that whereas a circuit breaker is illustrated as a control device, the term is intended to include other types of control devices. For example, control devices include, but is not limited to, panelboards, switches, fuses and combinations thereof.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. An electrical distribution board comprising:
   a framework defining a rectangular shape having a front, rear and side faces, the framework having vertical structure components;
   a meter compartment within the framework being defined by the front face of the framework, by a pair of side panels connecting to the vertical structural components and being disposed in a parallel relation to each other and to the side faces of the framework and perpendicular to the front face of the framework, by a bottom electrically insulating barrier connecting to a cross-member extending horizontally between the vertical structural components and by a bus partially defining the rear face of the meter compartment opposite the front face of the framework, the bus being electrically insulated from the framework and having one side facing the meter compartment adapted for electrical connection;
   an opening through each side panel and between each side face of the framework and the bottom barrier, the opening being of sufficient size to allow electrical connections therethrough;
   an L-shaped insulating barrier connecting to the bottom barrier and being disposed in front of the bus;
   whereby, the meter compartment is adapted to mount therein a meter socket assembly and to electrically connect line terminals extending from the rear face of the meter socket assembly to the bus and to electrically connect load terminals from the bottom edge of the meter socket assembly through the opening to other compartments.

2. The distribution board of claim 1 wherein the distribution board further comprises a control device compartment within the framework being defined by the front face of the framework, by the pair of side panels connecting to the vertical structural components, by a cross-member means adapted for supporting a control device, and by a top and bottom barrier connecting to the vertical structural structural components; and
   an opening between each side face of the framework and the top and bottom barrier, the opening of sufficient size to allow electrical connections therethrough.

3. The distribution board of claim 2 wherein the control device is a circuit breaker.

4. The distribution board of claim 1 wherein each side panel further comprises a mounting flange integrally formed therewith and extending perpendicularly and inwardly, each mounting flange adapted for securing a meter socket assembly.

5. An electrical distribution board comprising:
   a framework defining a rectangular shape having a front, rear and side faces, the framework having vertical structure components and a middle rail disposed in a parallel relation therebetween;
   a meter compartment within the framework being defined by the front face of the framework, by a pair of side panels connecting to the vertical structural components and being disposed in a parallel relation to each other and to the side faces of the framework and perpendicular to the front face of the framework, by a bottom electrically insulating barrier connecting to a cross-member extending horizontally between the vertical structural components with the middle rail extending therethrough and by a bus partially defining the rear wall of the meter compartment opposite the front face of the framework, the bus being electrically insulated from the framework and having one side facing the meter compartment adapted for electrical connection;
   an opening through each side panel and between each side face of the framework and the bottom barrier, the opening being of sufficient size to allow electrical connections therethrough;
   an L-shaped insulating barrier connecting to the bottom barrier and being disposed in front of the bus;
   whereby, the meter compartment is adapted to mount therein a meter socket assembly and to electrically connect line terminals extending from the rear face of the meter socket assembly to the bus and to electrically connect load terminals from the bottom edge of the meter socket assembly through the opening to other compartments.

6. The distribution board of claim 5 wherein the distribution board further comprises a control device compartment within the framework being defined by the front face of the framework, by the pair of side panels connecting to the vertical structural components, by a cross-member means adapted for supporting a control device, and by a top and bottom barrier connecting to the side rails; and
   an opening between each side face of the framework and the top and bottom barrier, the opening of sufficient size to allow electrical connections therethrough.

7. The distribution board of claim 6 wherein the control device is a circuit breaker.

8. The distribution board of claim 5 wherein each side panel further comprises a mounting flange integrally formed therewith and extending perpendicularly and inwardly, each mounting flange adapted for securing a meter socket assembly.

9. The distribution board of claim 5 wherein the distribution board further comprises a meter socket assembly for connection between a line bus and a branch load, the meter socket assembly including:
- a socket pan having a generally flat shape with a front face and a back face, and a top, bottom and side edges, the side edges being integrally formed with a pair of upstanding walls, each upstanding wall having a flange extending outwardly and perpendicularly therefrom;
- a socket molding assembly having a socket base supporting at least two pairs of terminal clips adapted for electrically connecting to an electrical meter, each terminal clip being secured to one end of a corresponding first bar extending downward, the socket base being positioned near the top edge and secured to the front face of the socket pan with an insulator positioned therebetween;
- a test block assembly having a test base for securing thereto a second bar connecting to the opposite end of the corresponding first bar and a line bar and a load bar for each phase, each line bar and load bar connecting at one end to the corresponding second bar, the test base being positioned near the bottom edge and secured to the front face of the socket pan;
- a plurality of load terminals adapted for electrically connecting to branch lines, each load terminal connecting to one end of a corresponding load bar, each load terminal being positioned below the bottom edge of the socket pan in a different overlapping plane from the other, whereby, the branch lines overlap one another and extend from the load terminals in a direction generally parallel to the bottom edge providing access to each load terminal from the front face of the socket pan;
- a plurality of line terminals adapted for electrically connecting to line bars, each line terminal connecting to one end of a corresponding line bar, each line terminal being positioned in the same plane below the bottom edge and beyond the back face of the socket pan; and
- mounting means on the flanges for positioning the socket pan parallel relative to the bus and enabling movement of the socket pan to provide sufficient force perpendicular to the bus for resiliently engaging and disengaging the line terminals.

10. The distribution board of claim 9 wherein the meter socket assembly further comprises a plurality of interphase barriers made of electrically insulating material, each interphase barrier having a flat elongated shape, one interphase barrier being positioned between each pair of load and line bars and the upstanding walls, each interphase barrier positioned next to one of the line bars having a flange integrally formed with the end of the interphase barrier and extending perpendicularly across the portion of the line bar extending beyond the back face of the socket pan.

11. The distribution board of claim 9 wherein the socket molding assembly further comprises a neutral wire connection terminal adapted to connect to an electrical meter.

12. The distribution board of claim 9 wherein the assembly further includes an electrical meter for monitoring the circuit between the load and line terminals.

13. A meter socket assembly for connection between a line bus and a branch load, the meter socket assembly comprising:
- a socket pan having a generally flat shape with a front face and a back face, and a top, bottom and side edges, the side edges being integrally formed with a pair of upstanding walls, each upstanding wall having a flange extending outwardly and perpendicularly therefrom;
- a socket molding assembly having a socket base supporting at least two pairs of terminal clips adapted for electrically connecting to an electrical meter, each terminal clip being secured to one end of a corresponding first bar extending downward, the socket base being positioned near the top edge and secured to the front face of the socket pan with an insulator positioned therebetween;
- a test block assembly having a test base for securing thereto a second bar connecting to the opposite end of the corresponding first bar and a line bar and a load bar for each phase, each line bar and load bar connecting at one end to the corresponding second bar, the test base being positioned near the bottom edge and secured to the front face of the socket pan;
- a plurality of load terminals adapted for electrically connecting to branch lines, each load terminal connecting to one end of a corresponding load bar, each load terminal being positioned below the bottom edge of the socket pan in a different overlapping plane from the other, whereby, the branch lines overlap one another and extend from the load terminals in a direction generally parallel to the bottom edge providing access to each load terminal from the front face of the socket pan;
- a plurality of line terminals adapted for electrically connecting to line bars, each line terminal connecting to one end of a corresponding line bar, each line terminal being positioned in the same plane below the bottom edge and beyond the back face of the socket pan; and
- mounting means on the flanges for positioning the socket pan parallel relative to the bus and enabling movement of the socket pan to provide sufficient force perpendicular to the bus for resiliently engaging and disengaging the line terminals.

14. The meter socket assembly of claim 13 wherein the meter socket assembly further comprises a plurality of interphase barriers made of electrically insulating material, each interphase barrier having a flat elongated shape, one interphase barrier being positioned between each pair of load and line bars and the upstanding walls, each interphase barrier positioned next to one of the line bars having a flange integrally formed with the end of the interphase barrier and extending perpendicularly across the portion of the line bar extending beyond the back face of the socket pan.

15. The meter socket assembly of claim 13 wherein the socket molding assembly further comprises a neutral wire connection terminal adapted to connect to an electrical meter.

16. The meter socket assembly of claim 13 wherein the assembly further includes an electrical meter for monitoring the circuit between the load and line terminals.

* * * * *